Sept. 25, 1973                J. M. AVERY                3,761,248
       METALLOTHERMIC PRODUCTION OF MAGNESIUM INDUCED
                    BY A STREAM OF INERT GAS
                       Filed May 17, 1971
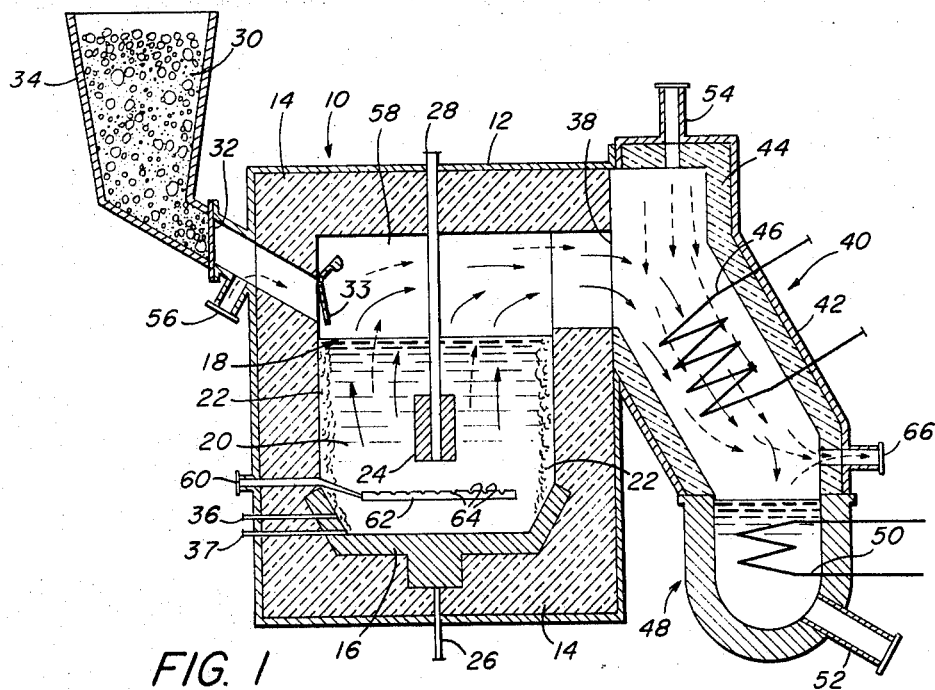
FIG. 1
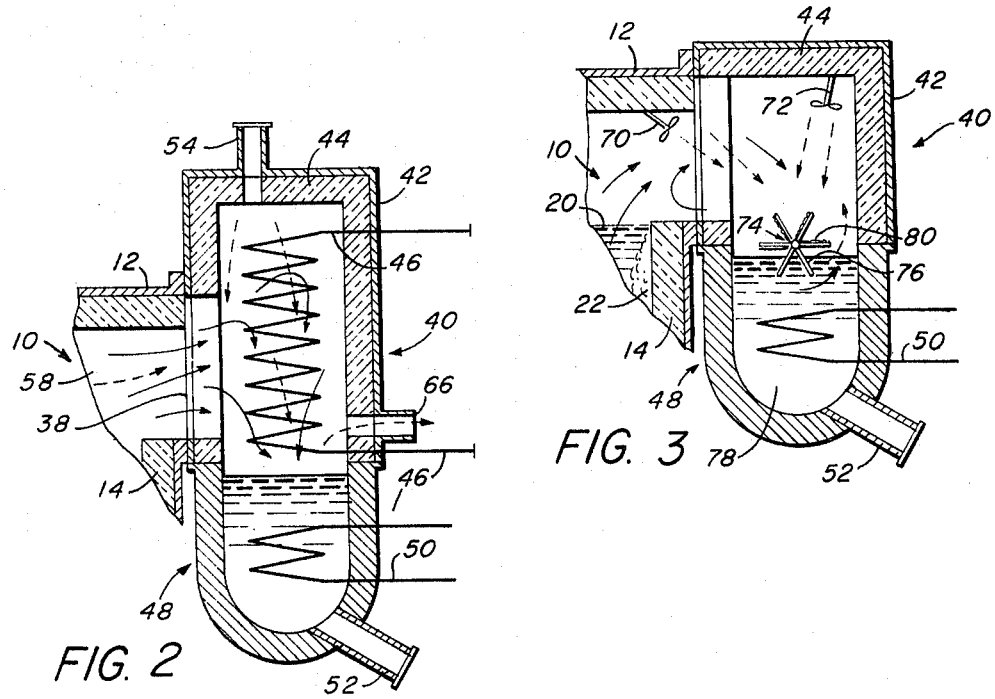
FIG. 2
FIG. 3
INVENTOR
JULIAN M. AVERY
BY *Russell & Nields*
ATTORNEYS

United States Patent Office 3,761,248
Patented Sept. 25, 1973

3,761,248
**METALLOTHERMIC PRODUCTION OF MAGNES-
IUM INDUCED BY A STREAM OF INERT GAS**
Julian Miles Avery, 47 Old Orchard Road,
Chestnut Hill, Mass. 02167
Continuation-in-part of applications Ser. No. 648,856,
June 26, 1967, now Patent No. 3,579,326, Ser. No.
796,214, Feb. 3, 1969, now Patent No. 3,658,509, Ser.
No. 26,116, Apr. 6, 1970, now Patent No. 3,698,888,
Ser. No. 26,117, Apr. 6, 1970, now Patent No.
3,681,053, and Ser. No. 26,118, Apr. 6, 1970. This
application May 17, 1971, Ser. No. 143,866
Int. Cl. C22b 45/00
U.S. Cl. 75—67 R                          11 Claims

ABSTRACT OF THE DISCLOSURE

A method of producing magnesium by the reduction of magnesium oxide by means of a metallic reducing agent, in the presence of a molten oxidic slag in an electric furnace and by the condensation of magnesium vapor evolved from the furnace wherein the production of magnesium is induced in part by the passage of inert gas through the magnesium condenser.

CROSS-REFERENCES TO RELATED APPLICATIONS

This application is a continuation-in-part of my co-pending applications, (1) Ser. No. 26,118, filed Apr. 6, 1970; (2) Ser. No. 796,214, filed Feb. 3, 1969 now U.S. Pat. No. 3,658,509; and (3) Ser. No. 648,856, filed June 26, 1967 now U.S. Pat. No. 3,579,326; (1) being a continuation-in-part of (2) and (3), and (2) being a continuation-in-part of (3). Also the present invention is related to my co-pending applications, Ser. Nos. 26,116 now U.S. Pat. No. 3,698,888 and 26,117 now U.S. Pat. No. 3,681,053, both filed on Apr. 6, 1970.

BACKGROUND OF THE INVENTION

This invention is concerned with the production of magnesium metal by the metallothermic reduction of magnesium oxide at elevated temperatures, in the presence of a metallic reducing agent and a molten oxidic slag, in an electric furnace, and the condensation of vaporized magnesium in a condenser. The background of this invention is discussed in detail in my related applications cited above.

BRIEF SUMMARY OF THE INVENTION

The production of magnesium in accordance with the present invention is induced in part by the passage of a stream of inert gas through the condenser or condensation zone. Preferably, the inert gas stream is brought into the condensation zone at the condenser top and passes downwardly through the condenser, concurrently with the magnesium vapor. The inert gas stream promotes magnesium condensation, by increasing the rate of flow of magnesium vapor to the condenser and by preventing the development of a stagnant condition or thermal blockage which could result if static, cooled magnesium droplets (fog) or inert gas is allowed to collect in the condenser preventing efficient operation of the condenser. Alternatively, an inert gas stream may be introduced into the reaction zone above the molten slag, to promote passage of the magnesium vapor to the condenser, or an inert gas stream may be introduced beneath the upper level of the molten slag. Combinations of the above alternative means of introducing an inert gas stream may, of course, be employed.

The inert gas in the reactor and condenser is substantially static, and transfer of magnesium vapor from reactor to condenser is predominately by diffusion, notwithstanding the streams of inert gas which are an element of this invention. These terms are defined hereafter.

The inert gas stream may be used to promote the process by providing part of the cooling needed to condense the magnesium, thereby reducing condenser requirements. For such a purpose inert gas at a temperature of about 100–1100° C. may be introduced into the reaction zone or condensation zone, but not into the molten slag, where vaporization of magnesium should not be retarded. The temperature will depend upon the heat capacity of the inert gas, the amount of the stream, as well as the extent of cooling desired.

The inert gas stream, however introduced, is removed from the condenser after passage through or beside the condensation surfaces. The rate of flow of the inert gas stream need not be great in order to obtain the advantages of the present invention, and preferably falls in the range of 0.05–1 mole of inert gas per mole of magnesium condensed.

BRIEF DESCRIPTION OF THE DRAWINGS

FIG. 1 is a cross-sectional view of a reactor and condenser suitable for the metallothermic production of magnesium in accordance with the present invention; and FIGS. 2 and 3 are cross-sectional views of alternative condenser arrangements for use in conjunction with the reactor of FIG. 1, with the reactor broken away.

DETAILED DESCRIPTION OF THE INVENTION

In the present invention magnesium is produced in a reactor-condenser system by the reduction of a magnesium oxide with a metallic reducing agent in the presence of a molten oxidic slag, from which the magnesium is evolved as vapor to be carried from the reactor to the condenser, wherein magnesium production is induced in part by the passage of a stream of inert gas through the condenser, although the inert gas in the reactor-condenser system is still substantially static.

A reaction-condensation system suitable for the present process is described in my co-pending applications, referred to above. The system is provided with means to supply to the reactor or condenser a stream of inert gas for passage through the condenser, and means to remove inert gas from the condensation zone and to recycle it back to the condenser or the reaction zone, including if desired means to heat or cool the inert gas.

Some terms need definition. As employed herein, the term "inert gas" includes those gaseous materials that are non-reactive with the components of the system under the conditions of operation. Because of the high chemical activity of magnesium at elevated temperature, few gases can be considered inert in the present process. Suitable inert gases include the literally inert gases, such as helium, neon, argon and the like. Another non-reactive gas is hydrogen, which is in certain respects desirable.

By "substantially static" inert gas and the passage of magnesium "predominately by diffusion," I mean that the movement of the magnesium vapor is faster than the movement, if any, of the inert gas from the reaction zone to the condenser, or that the magnesium vapor passes through the inert gas, rather than vice versa. Thus, the terms are interrelated and together meet the two conditions. But these conditions are very difficult of measurement and, in part, somewhat functional. Consequently, I prefer to define the terms in a manner more precise: the molal flow rate of the magnesium vapor to the condenser must be greater than that of the inert gas, for the inert gas to be "substantially static," and preferably at least twice as great; and the partial pressure of the inert gas in the condenser must be at least 0.05 atmosphere for the magnesium transfer to be "predominately by diffusion," and preferably at least as high as the partial pressure of the magnesium vapor in the reaction zone. For simplicity the molal flow of magnesium can be considered equal to the magnesium production rate (in moles); and that of inert gas, to the recycle rate (in moles) including that amount purged.

In order that the advantages of this invention be obtained, it is necessary that the inert gas be substantially static. Of course, in any vapor system the components are never absolutely static, since the molecules or atoms are continuously moving about. By "static" here I mean no net movement between the reaction zone and the condensation zone. "Substantially static" includes as well as a net movement up to that of the magnesium vapor from the reaction zone to the condenser. If this latter rate is exceeded, the advantages of this invention are not obtained, and the magnesium vapor transfer would no longer be predominately by diffusion but by a sweeping, in which case the magnesium vapor partial pressure would be decreased. Similarly, without a substantial amount of inert gas present, i.e. a partial pressure in excess of 0.05 atmosphere, there can be no substantial diffusion but only distillation.

The identity of the inert gas is of course an important factor, with the molar flow rate for light gases, such as hydrogen, being greater than that for heavier gases, such as argon, for equivalent mass flow, and the reverse is true for equivalent heat capacity, in general. The rate of flow of the inert gas stream is about 0.05–1 mole per mole of magnesium condensed (M/M). Greater rates, up to about 25 M/M may be employed, but such high rates usually result in greater complications, e.g. increased system size or lowered condenser efficiency, than advantages.

The partial pressure of inert gas in the system is defined as its pressure at the condenser (conveniently measured in the purge or recycle system). The partial pressure of magnesium vapor in the condenser is approximately the vapor pressure of magnesium at its melting point (about 7 mm.); the pressure of magnesium vapor in the furnace space is determined by the pressure drop in the duct, which also affects the pressure differential of the inert gas between the furnace and the condenser. The partial pressure of the inert gas in the condenser and that of magnesium vapor in the furnace may therefore be quite different, but the total pressure on the system at any point will be at least as great as that of the inert gas in the condenser.

The inert gas stream is preferably introduced near the inlet of the condenser from the reactor immediately upstream from the condensation surfaces. In this manner, the inert gas stream may be directed across the magnesium inlet, thereby inducing flow of magnesium vapor from the reactor without substantial disturbance to the reactor atmosphere. This would in effect combine the advantages of the present invention with the advantages of my invention disclosed and claimed in Ser. No. 26,118, because an atmosphere of substantially static inert gas may be maintained in the reactor, and transfer of magnesium to the condenser would be predominantly by diffusion.

The advantages of both inventions may also be obtained even if an inert gas stream is introduced into the reactor, provided that the "substantially static" and "predominantly by diffusion" limitations are still met. It then becomes a matter of balancing the desired advantages of the two inventions. In any case, it will generally be found beneficial to introduce part of the inert gas stream into the reactor (e.g. to prevent magnesium deposit in the inlet ducts) but the major portion in the condenser (to induce the reaction without substantial disturbance to the reactor atmosphere).

In the reactor, the inert gas may be introduced in the solid feed lines, by bubbling into the molten slag or in any other manner or location desired.

If a stream of inert gas is introduced into the condenser, it should be at a temperature of about 100–1500° C. and a rate of about 0.2–10 M/M—preferably 100–800° C. and 0.2–5 M/M. In the furnace, the inert gas stream should be at about 600–1500° C. and 0.05–1 M/M—preferably 0.1–1 M/M. In the slag, the inert gas stream should be at about 1200–2000° C. (in order not so solidify the slag at the gas distribution orifices nor to retard the reaction) and 0.05–1 M/M—preferably 1500–2000° C. and 0.2/1 M/M. The total flow rate of the inert gas stream, from all sources, through the condenser, is therefore 0.05–10 M/M, or preferably 0.1–7 M/M. It is highly desirable to introduce the inert gas in the furnace or condenser at or near the temperature at which it is removed from the condenser, i.e. at about 600–800° C., in order to avoid cooling or heating. The gas may be cooled or heated, or both, and it is possible, and in some instances perhaps preferable, to have plural streams introduced at different temperatures at different points.

If introduced into the furnace or condenser, hydrogen is the preferred inert gas. Hydrogen is cheap and easily available, it provides excellent characteristics for heat transfer in the condenser, and it provides a relatively high specific rate of diffusion. Because of a relatively high diffusivity of magnesium vapor through the gases of lower atomic weight, helium or hydrogen, including mixtures thereof, is preferred. A useful gas is a mixture of hydrogen or helium with up to 50 percent by volume of argon. Methane may also be used, provided it does not reach a temperature above its point of thermal decomposition, i.e. 1200° C. In the slag, where the gas temperature is at least 1200° C., or preferably 1500° C., the preferred inert gas is helium or argon, since the possible hazard of heating hydrogen to that level should be avoided, although a mixture of hydrogen and helium or argon can be used, and methane would probably decompose.

There are several factors involved in choosing the correct inert gas stream, or combinations thereof, and the most beneficial conditions. These factors include: (1) the physical effect of the stream on the stillness or turbulence of the vapor space and on the promotion of the reaction, both of which can be almost negligible at a low M/M value, particularly if the stream is limited to the condenser; (2) the cooling effect (or even heating) of the inert stream; (3) the effect of the inert gas on the reaction which, unless outweighed by (1), will, other things being equal, require the magnesium reaction pressure to increase, but only if diffusion through the gas is a major factor; (4) the effect of the inert gas on the condenser efficiency; and (5) miscellaneous effects, such as fogging, prevention of magnesium backup into the feed lines, and the like. Thus, for a given magnesium ore, slag, slag temperature and alloy, the optimum combination may well involve some experimentation, but in any event the use of a stream of inert gas can be made to promote the reaction.

The present invention should be contrasted to those systems where an inert gas is used to "sweep" a product vapor from a reaction zone, or to maintain the reaction zone at atmospheric pressure in a "solid state" system. See, for example, Foukuet, U.S. Pat. No. 2,558,744, where high pressure inert gas is passed laterally through a solid state vertical reaction zone as a current of gas which sweeps magnesium vapor through an orifice into a condensation chamber. See also the similar process of Eisenberg et al., U.S. Pat. No. 3,427,152, also a solid state process, where a countercurrent stream of heated hydrogen is used for heat transfer and acts to sweep the magnesium from the kiln. A similar process was apparently referred to in W. Moschel et al., "Magnesium" Chemische Technologie, vol. 5 pp. 102–64 (Winnacker & Weingartner, ed.) (1953), where solid dolomite was reduced by silicon, and a stream of hydrogen was used (p. 145). The conclusion there reached was that in such a system it was necessary to operate above the temperature at which the magnesium reaction pressure is one atmosphere, in order to carry the reaction to completion, otherwise the reaction would stop. The use of a stream of inert gas was suggested as improving the usefulness of the operating space and to permit continuous operation. It was said that the technical possibility of such a process was studied at a major laboratory in Germany, and became the subject matter of two German patents, Nos. 666,712 and 690,714, but was discarded in favor of the vacuum method.

This "sweeping" of gas through solid reactants involves a distinguishable procedure from that of the present invention, where the inert gas is passed as a stream through the condenser in order to promote the evolution of magnesium vapor from the molten oxidic slag.

The present process is also different from those that employ an inert gas, generally intermittently and in small amounts, to purge impurities or to flush parts of the system, see e.g., Bretschneider et al., U.S. Pat. No. 3,017,263 and Artru et al., No. 2,971,833. Such procedures may be used in conjunction with the present process, if desired, but my present invention contemplates the use of the stream of inert gas substantially throughout the reaction.

The potential partial pressure of the magnesium vapor in the reaction zone depends, of course, upon other conditions, primarily the temperature and composition of the slag bath, but also the concentration of magnesium oxide in it, the composition and concentration of the reducing agent, and the composition of the "spent" alloy. There is preferably a pressure differential of the magnesium vapor between the furnace and the condenser to provide a mass-transfer driving force for transferring the magnesium vapor to the condenser predominately by diffusion.

The total pressure of the system, including the partial pressure of both the magnesium and the inert gas, is at least 0.1 atmosphere, and preferably about 0.25 to 1.5 atmosphere. Ordinarily, the partial pressure of the inert gas in the condenser need not be higher than one atmosphere (or slightly less) in order that the absolute pressure of the system be about one atmosphere. But, if desired, the absolute pressure may be higher, and the partial pressure of the inert gas may be correspondingly higher. It may be advantageous to increase the absolute pressure of the system above 1 atmosphere, for example, in order to decrease the metallic impurities, or to assist the periodic removal of spent by-products or magnesium from the system. It appears that there is no real advantage in having the inert gas partial pressure, or the absolute pressure of the system, higher than about 5 atmospheres.

Useful constituent reactants, slag compositions, temperatures are described in my co-pending applications referred to above. The magnesium oxide reactant may comprise magnesia, usually derived from magnesite by calcination, or calcined dolomite, an equimolar combination of magnesium oxide and calcium oxide, or mixtures of both. The metallic reducing agent may be silicon, aluminum, aluminum-silicon, ferrosilicon-aluminum, calcium-silicon, calcium-aluminum-silicon or the like. The oxidic slag generally contains a mixture of calcium, aluminum and silicon oxides, sometimes called a calcium-aluminum-silicate or lime-alumina-silica slag, in combination with the magnesium oxide reactant. The temperature of the slag, and hence of the system, depends primarily on the slag composition (i.e., it must be molten) but the temperature is usually at least 1300° C., and preferably about 1400–1700° C.

In the operation of a process such as has been described, small amount of impurities in the raw materials fed to the system (e.g., residual $CO_2$ and $H_2O$ in the oxidic portion of the charge, and air trapped with the raw materials in the feed hoppers) may find their way into the furnace and produce gases, such as $H_2$ or CO, which should be vented from the system. These gases may be removed as required by bleeding off the inert gas, in which they will be present as impurities, in order to prevent an undesirable buildup of pressure.

The operation of the present process under relatively high absolute pressure significantly decreases the leakage of air into the system. This decrease is advantageous, since the presence of air results in the reaction of oxygen and nitrogen with the magnesium product not only to decrease yield but also to form accretions of solid matter on the system walls. In particular the decrease of solids deposited on the heat transfer surfaces substantially increases the condenser efficiency and extends the period between shutdowns. Moreover, a high absolute pressure, particularly as atmospheric pressure is approached, makes it possible to operate the process as a continuous or semi-continuous process, with attendant benefits, such as facilitating removal of spent slag, spent alloy and magnesium product. Further, even if a batch process is used, the need for a hermetically sealed reaction-condensation system is diminished—and problems, such as vacuum breaking, may be avoided—completely, or at least to a significant extent.

The present invention will be better understood by reference to the attached drawings, wherein a reactor-condenser system is shown employing an inert gas stream. Reactor 10 comprises outer steel shell 12, refractory lining 14 and carbon electrode 16, defining reaction zone 18. The portion of the reaction zone 18 containing molten oxidic slag 20 is lined with frozen slag 22 for protection of the refractory lining 14. Necessary heat to maintain the slag 20 molten and to supply the heat of reaction is provided electrothermically by conduction between carbon electrodes 16 and 24, provided with conductors 26 and 28. Solid raw materials 30, e.g. dolomite, magnesite or alumina or combinations thereof and metallic reducing agent, are introduced in one or more inlets 32, provided with flap 33, from storage chamber 34. The purpose of flap 33, which is counterweighted, is to prevent backup of magnesium vapor into inlet 32, where it could condense. Spent slag and alloy are tapped from slag outlet 36 and alloy outlet 37. The evolving magnesium vapor (solid arrows) leaves the reactor via vapor outlet 38.

Condenser 40 includes steel casing 42, refractory lining 44 and condensation surfaces 46, of any suitable design, and condenses magnesium as liquid or solid into crucible 48, which is provided with heating means 50 and molten magnesium outlet 52. Means 50 may also be used for cooling or solidifying the condensed magnesium. Alternatively, magnesium may be collected as a solid in a similar crucible which may be detached periodically from condenser 40 for removal to a magnesium foundry section, not shown.

An inert gas stream is introduced into the condenser at inlet 54, located immediately above reactor outlet-condenser inlet 38, and oriented to direct a stream of inert gas (dashed arrows) across the path of the magnesium vapor flow (solid arrows). To a lesser degree, inert gas is also introduced via inlet 56 through solids inlet 32 directed into the vapor space 58 above the molten slag 20; and via inlet 60 and gas dispersion means 62 (of suitable design to prevent blockage by slag solidification in dispersion orifices 64), up through slag 20 and vapor space 58.

The inert gas stream supplied through gas dispersion means 62 must be heated sufficiently to prevent blockage by solidification of the molten slag, preferably to at least 1500° C.; the inert gas stream supplied to inlets 54 and 56 may also be heated or cooled if desired; all by means not shown. If desired the inert gas stream supplied via inlet 54 may be controlled, with respect to temperature or flow, in order to control the condensation efficiency.

The inert gas stream passes adjacent condensation surfaces 46 and exits the system via outlet 66, which may be provided with secondary magnesium condensation means (not shown) if desired. The inert gas may be then recycled to inlets 54, 56 and 60, after purging a portion and heating (by means not shown), if desired.

FIG. 2 shows an alternative arrangement of condenser 40, above reactor outlet-condenser inlet 38, which arrangement promotes more turbulent mixing of the inert gas stream and magnesium vapor adjacent condensation surfaces 46.

Certain modifications of the illustrated system are within the skill of the art. For example, the inert gas stream may be passed through the condensation zone by a fan in the reactor or condenser, it not being necessary to remove a stream from the entire system, except as may be necessary for purging gaseous by-products.

Similarly, the condensation surfaces need not be coils or the like, but may be in the form of paddle-wheels dipping into the molten magnesium and passing through the magnesium-inert gas vapor space, in which case the inert gas stream can beneficially direct the magnesium into contact with the condensation surfaces. Such an arrangement is shown in FIG. 3, wherein fans 70 and 72 direct the inert gas-magnesium vapor into contact with rotating paddle-wheel 74, having condensation surfaces 76 which dip into molten magnesium 78 and pick up molten magnesium droplets 80. Rotating discs or any similar mechanisms to promote condensation, may be used in place of paddle-wheel 74.

Examples

The following examples represent representative utilizations of the present invention in a reaction-condensation system, like that shown in FIG. 1.

The purpose of these examples is not to present necessarily the preferred embodiments primarily, but to indicate the wide range of possible permutations and combinations of raw materials, reducing agents, slag compositions, inert gases, distributions, flow rates and temperatures. These examples are summarized in the attached table. The preferred examples at this writing appear to be Nos. 1 and 3, although no single example is necessarily superior or inferior to the others in all respects.

In any practical process inert gas can be used at atmospheric pressure either by increasing the rate of flow through furnace or by enlarging the duct. If the slag temperature is too high, e.g. Case No. 3 at 1700° C., flux can be used. Stoichiometric data are calculated and are reasonably accurate.

and the influence of the inert gas stream; see for example the chart given by Moschel, supra at p. 145. The pressure of the inert gas in the condenser ($p_{GC}$) is also about equal to the absolute pressure in the system. The designations c, f and s relate to the inlets through which the inert gas stream is introduced to the system, "c" being the condenser (54), "f" being the furnace (56) and "s" being the slag (60). The identity of the inert gas, either methane, hydrogen, argon or helium is also given.

All of the examples are based upon operations suggested in my previous application, except Nos. 6–8. Nos. 6 and 8 involve the use of the present invention with two prior art operations, and No. 7 represents an improved Magnetherm operation, using a more active charge oxide and alloy. In all of the examples except 6 and 8, a system pressure of about 1 atmosphere may be employed, provided hydrogen is used, and in those two exceptions atomspheric pressure can be used with a slight increase in the rate of flow. The total pressure on the systems may be controlled by means not shown, such as a control valve in the inert gas circulation system, at or near outlet 66.

Some of the assumptions I have made may be in serious error, and for reasons beyond my knowledge some examples as given may even be inoperative. But in my judgment all of the above examples can be made operable at atmospheric pressure by adjustment of the slag composition or distribution, rate and temperature of the inert gas, all of which being within the skill of the art. In certain of these examples, namely 1, 2, 4, 7 and 8, and possibly 5 as well, the mechanism of mass transfer of magnesium is predominantly by diffusion through a substantially static atmosphere, while in the remaining examples diffusion is not a major consideration. In Examples 3 and 6, the transfer from the reactor to condenser is effected at M/M greater than 1, and hence in these examples the reaction-condensation vapor is not substantially static and magnesium vapor transfer is not predominately by diffusion. Thus, these Examples (3 and 6) are beyond the scope of the present invention, although in other respects they illustrate certain aspects of it.

I claim:

| | Oxidic raw material | | | Alloy reductant composition, percent | | | Slag | | | | M.P., ° C. (approx.) | Pressure (atm.) | | Inert gas, m./m. | | | Inert gas, T., ° C. | | |
|---|---|---|---|---|---|---|---|---|---|---|---|---|---|---|---|---|---|---|---|---|
| Ex. No. | MgO | CaO·MgO | Al₂O₃ | Si | Al | Fe | CaO | MgO | Al₂O₃ | SiO₂ | A(SiO₂) est. | | $p_{ME}$ | $p_{GC}$ | c | f | s | c | f | s |
| 1 | [1]1.46 | [1]1.00 Total 2.46[1] | | 50 Ratio 0.84[3] | 40 | 10 | 28 | 10 Ratio 2.10[1] | 30 | 32 | ~0.02 | 1,500 | 0.50 | 0.5 | CH₄ 1 | CH₄ 100 | | | | |
| 2 | 1.15 | 1.92 Total 2.07 | | 70 Ratio 0.62 | 30 | | 42 | 10 Ratio 2.68 | 14 | 35 | ~0.01 | 1,600 | 0.40 | 1 | H₂ 2.8 | H₂ 100 | | | | |
| 3 | 1.29 | 2.59 Total 3.88 | | 80 Ratio 0.61 | 20 | | 43 | 20 Ratio 3.50 | 7 | 30 | ~0.01 | 1,700 | 0.40 | 1 | Ar | Ar 2 | 0.3 | | 650 | 1,500 |
| 4 | 1.41 | 1.74 Total 3.15 | | 80 Ratio 0.64 | 18 | 2 | 46 | 15 Ratio 2.02 | 9 | 40 | ~0.06 | 1,350 | 0.30 | 0.4 | He | He 0.5 | | | 1,500 | |
| 5 | | 4.42 Total 4.48 | [1]0.42 | 98 Ratio 0.58 | | 2 | 57 | 5 Ratio 4.42 | 10 | 28 | <0.01 | 1,500 | 0.65 | 1.5 | CH₄ 3 | CH₄ 1 | 100 | 650 | | |
| 6 | 1.19 | 1.72 Total 2.91 | | 98 Ratio 0.58 | | 2 | 40 | 10 Ratio 2.5 | | 50 | ~0.30 | 1,450 | 0.10 | .4 | H₂ 5 | H₂ 3 | 0.2 | 100 | 650 | 1,500 |
| 7 | 0.63 | 2.84 Total 3.47 | | 48 Ratio 0.81 | 27 | 23 | 55 | 5 Ratio 3.0 | 15 | 25 | <0.01 | 1,500 | 0.40 | 0.8 | He 2 | He | 0.2 | 100 | | 1,500 |
| 8 | | 5.15 Total 6.11 | 0.96 | 78 Ratio 0.86 | | 22 | 55 | 5 Ratio 5.7 | 15 | 25 | <0.01 | 1,500 | 0.15 | 0.3 | Ar 0.25 | Ar | | | 650 | |

[1] Ratio, per unit weight of Mg produced.

The specification in the table of oxidic raw material and alloy reductant is straightforward, as well as the composition of the resulting slag, percentages being given by weight. The SiO₂ activity is estimated in part, and is based in part on published charts of Chipman. Similarly, the slag melting point is estimated from available data. The pressure of the magnesium ($p_{ME}$) is an estimated value for the reaction pressure of the magnesium at the slag temperature, taking into account the SiO₂ activity 1. A process for the production of magnesium in a reaction-condensation system which comprises reacting magnesium oxide and a metallic reducing agent in the presence of a molten oxidic slag, evolving magnesium vapor from a reaction zone to a condensation zone, maintaining substantially static inert gas in the vapor space of the reaction zone, wherein the molal flow rate of the magnesium vapor from the reaction zone to the condensation zone is greater than that of the inert gas, the partial pressure of the inert gas in the condensation zone is at least 0.05 atmosphere and transfer of magnesium vapor from the reaction zone to the condensation zone is predominately by diffusion through said inert gas, and passing a stream of inert gas through said condensation zone.

2. The process of claim 1, including introducing said inert gas stream at least in part at one end of said condensation zone and removing same at another end of said condensation zone remote therefrom at a temperature of about 100–800° C. and at a rate of about 0.2–5M/M.

3. The process of claim 1, including introducing said inert gas stream at least in part in said reaction zone at a temperature of about 600–1500° C. and at a rate of at least 0.05 M/M.

4. The process of claim 3, including introducing said inert gas stream at least in part through gas dispersion means located beneath said molten oxidic slag at a temperature of about 1200–2000° C. and at a rate of at least 0.05 M/M.

5. The process of claim 4, including introducing said inert gas stream at least in part at one end of said condensation zone and removing same at another end of said condensation zone remote therefrom at a temperature of about 100–800° C. and at a rate of about 0.2–5 M/M.

6. The process of claim 3, including introducing said inert gas stream at least in part at one end of said condensation zone and removing same at another end of said condensation zone remote therefrom at a temperature of about 100–800° C. and at a rate of about 0.2–5 M/M.

7. The process of claim 1, wherein means are provided to control the relative flow rate of the inert gas from the reaction zone to the condensation zone.

8. The process of claim 3, including introducing said inert gas stream into an inlet connecting with a solids inlet.

9. The process of claim 3, including providing means to prevent backup of magnesium vapor into a solids inlet.

10. The process of claim 1, including directing said inert-gas-magnesium vapor into contact with condensation means located in said condensation zone.

11. The process of claims 10, wherein said condensation means includes a rotating paddle-wheel having condensation surfaces which dip into molten magnesium and pick up molten magnesium droplets for contact with said vapor.

References Cited
UNITED STATES PATENTS

| | | | |
|---|---|---|---|
| 3,317,405 | 5/1967 | Brown | 202—202 X |
| 3,520,524 | 7/1970 | Stawarz et al. | 75—67 UX |
| 3,441,402 | 4/1969 | Magee et al. | 75—67 X |
| 2,353,193 | 7/1944 | Sayers | 75—67 |
| 2,213,170 | 8/1940 | Peake et al. | 75—67 |
| 2,095,578 | 10/1937 | Theiler | 203—49 X |
| 1,955,964 | 4/1934 | Kemmer | 203—49 X |
| 489,363 | 1/1893 | Bornholdt | 203—49 |
| 1,833,717 | 11/1931 | Laird | 203—49 |
| 2,088,165 | 7/1937 | Erdmann | 75—67 X |
| 2,200,772 | 5/1940 | Erdmann | 75—67 |
| 2,362,718 | 11/1944 | Pidgeon | 75—67 X |
| 2,433,397 | 12/1947 | Rhoades | 75—67 |
| 2,558,744 | 7/1951 | Fouquet | 75—67 |
| 1,311,380 | 7/1919 | Bleecker | 75—67 |
| 1,864,161 | 6/1932 | Witter | 75—63 |
| 3,475,162 | 10/1969 | Rhodes et al. | 75—67 |

L. DEWAYNE RUTLEDGE, Primary Examiner

M. J. ANDREWS, Assistant Examiner

U.S. Cl. X.R.

203—49